(12) United States Patent
Mitra et al.

(10) Patent No.: US 11,223,964 B2
(45) Date of Patent: Jan. 11, 2022

(54) MANAGING AND MANAGEMENT OF TEMPERATURE OF A WIRELESS SYSTEM

(71) Applicant: NXP USA, Inc., Austin, TX (US)

(72) Inventors: Arnab Kumar Mitra, San Ramon, CA (US); Deepak Nagawade, Fremont, CA (US); James Kang-Wuu Jan, San Jose, CA (US); Rajas Ravindra Mahajan, Santa Clara, CA (US); Ashish Vijay Bhattad, Pune (IN); Vishal Veeragandham, Pune (IN); Yui Lin, Palo Alto, CA (US); Sridhar Reddy Narravula, Cupertino, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/999,317

(22) Filed: Aug. 21, 2020

(65) Prior Publication Data

US 2021/0058802 A1  Feb. 25, 2021

Related U.S. Application Data

(60) Provisional application No. 62/892,432, filed on Aug. 27, 2019, provisional application No. 62/890,458, filed on Aug. 22, 2019.

(51) Int. Cl.
*G08C 17/00* (2006.01)
*H04W 24/02* (2009.01)
*H04W 52/02* (2009.01)

(52) U.S. Cl.
CPC ....... *H04W 24/02* (2013.01); *H04W 52/0209* (2013.01)

(58) Field of Classification Search
CPC .......................... H04W 24/02; H04W 52/0209
See application file for complete search history.

(56) References Cited

U.S. PATENT DOCUMENTS

| | | | | |
|---|---|---|---|---|
| 4,939,786 | A * | 7/1990 | McCallum | H04B 1/036 455/67.11 |
| 2012/0075992 | A1* | 3/2012 | Shahidi | H04W 52/0251 370/235 |
| 2016/0178456 | A1* | 6/2016 | Yum | H03F 3/24 374/152 |
| 2017/0303164 | A1* | 10/2017 | Chu | H04B 7/0452 |
| 2018/0077640 | A1* | 3/2018 | Wang | H04W 52/0206 |
| 2020/0077258 | A1* | 3/2020 | Doyle | H04L 9/0891 |
| 2020/0379034 | A1* | 12/2020 | Khandhar | G06F 30/20 |

\* cited by examiner

*Primary Examiner* — Erika A Washington
(74) *Attorney, Agent, or Firm* — Neilesh R. Patel

(57) ABSTRACT

A dynamic temperature manager of a wireless system determines a threshold temperature defined by one or more operating parameters of the wireless system, the threshold temperature indicating a temperature in response to which power consumption of the wireless system is to be reduced. The dynamic temperature manager receives an indication of a temperature of the wireless system. A determination is made that the temperature exceeds the threshold temperature. The dynamic temperature manager provides an indication to cause a media access control (MAC) processing circuitry of the wireless system to adjust the one or more operating parameters of the wireless system to reduce the power consumption and the temperature of the wireless system based on the determination that the temperature exceeds the threshold temperature.

16 Claims, 7 Drawing Sheets

| ACTIVITY INDEX (Ai) | 2G | | 5G | | TT | POLICY | |
| --- | --- | --- | --- | --- | --- | --- | --- |
| | # OF ACTIVE CHAINS | AMSDU AGGREGATION | # OF ACTIVE CHAINS | AMSDU AGGREGATION | | 2G | 5G |
| 1 | 2 | ON | 2 | ON | 115 | AIRTIME = 1ms TX DUTY CYCLE = 50% | AIRTIME = 1ms TX DUTY CYCLE = 50% |
| 2 | 2 | OFF | 2 | ON | 115 | TX DUTY CYCLE = 50% | AIRTIME = 1ms TX DUTY CYCLE = 50% |

FIG. 3

MANAGING AND MANAGEMENT OF TEMPERATURE OF A WIRELESS SYSTEM

RELATED APPLICATIONS

This application claims benefit of priority to U.S. Provisional Application No. 62/892,432, entitled "Dynamic Thermal Management," filed Aug. 27, 2019 and U.S. Provisional Application No. 62/890,458, entitled "Dynamic Thermal Management," filed Aug. 22, 2019, the contents each of which are incorporated herein by reference in their entities.

FIELD OF USE

This disclosure generally relates to a wireless system and method for transmitting and receiving wireless signals, and more particularly to managing and management of temperature of the wireless system.

BACKGROUND

A wireless system performs complex signal processing functions associated with transmitting and receiving wireless signals. To perform the complex signal processing functions, the wireless system consumes power and generates heat as a byproduct of the complex signal processing. Excessive heat will degrade performance of the wireless system or worse cause the wireless system to fail.

BRIEF DESCRIPTION OF THE DRAWINGS

FIG. 3 is an example activity table to manage temperature in accordance with exemplary embodiments of the invention.

Figure 1:
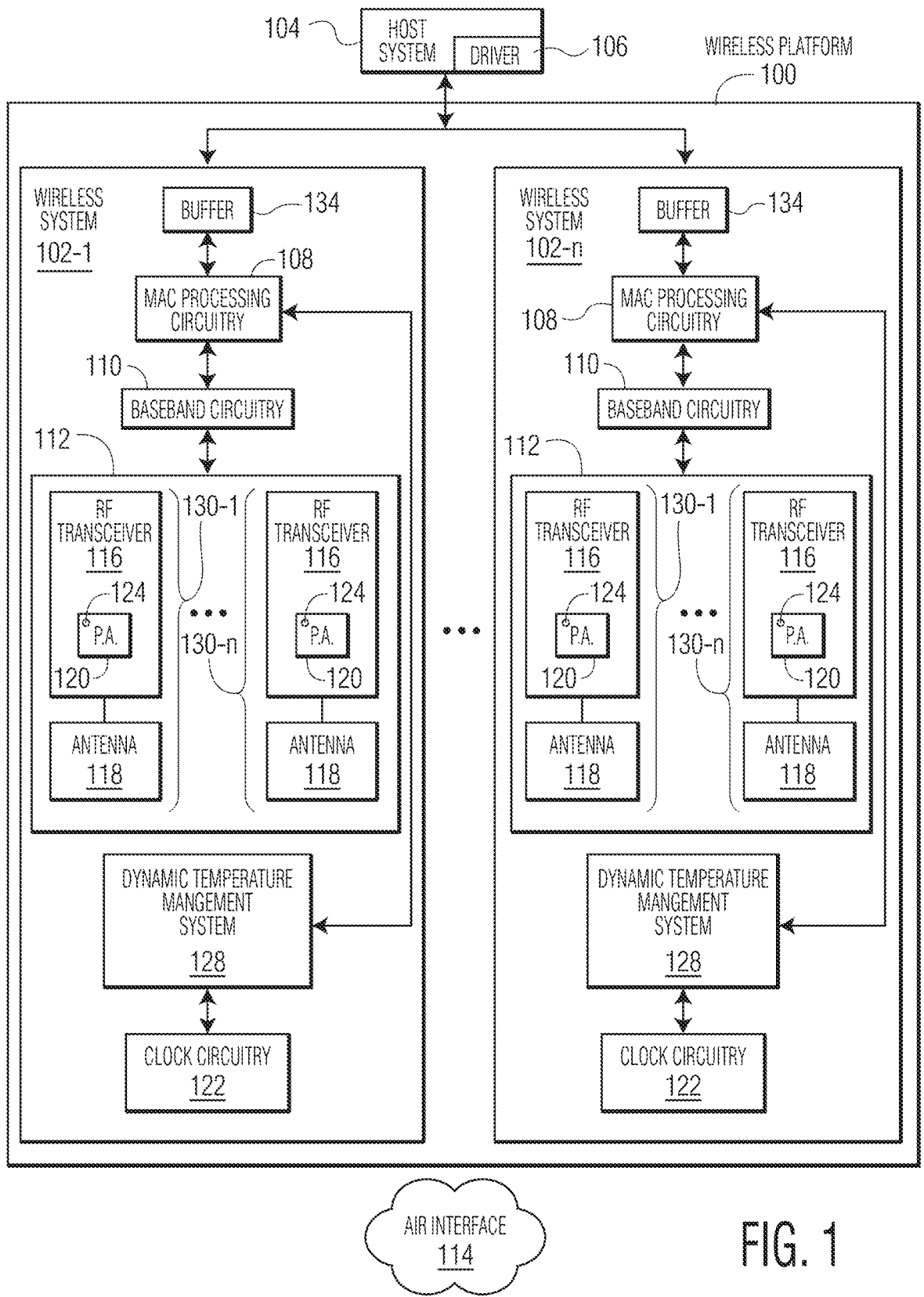
FIG. 1 is an example block diagram of a wireless system associated with a wireless platform in accordance with exemplary embodiments of the invention.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with managing a temperature of a wireless system. A wireless system has one or more wireless radios to facilitate transmitting and receiving wireless signals. A temperature sensor measures a temperature of one or more circuits of a wireless radio such as a power amplifier. In the event that the temperature reaches a threshold temperature (TT), a thermal management system reduces power consumed by the wireless system to reduce heat generated by the wireless system so that the wireless system does not reach a critical temperature where the heat degrades performance of the wireless system or worse the wireless system fails to operate. The thermal management system reduces power consumed by the wireless system by changing one or more operating parameters of the wireless system and in particular media access control (MAC) processing of the wireless system. The thermal management system will continue to monitor the temperature and change the one or more operating parameters of the wireless system until the temperature is below the TT. Well known instructions, protocols, structures, and techniques have not been shown in detail in order not to obfuscate the description.

Example System

FIG. 1 is an example block diagram of one or more wireless systems 102-1 to 102-n associated with a wireless platform 100. The one or more wireless systems 102-1 to 102-n may be arranged on the wireless platform 100 which provides power to the one or more wireless systems 102-1 to 102-n and facilitates inter-wireless system communication, among other operations. The wireless system 102 may be implemented by one or more integrated circuits or one or more wireless chips which transmit and receive wireless signals. In examples, a wireless system 102 may operate in accordance with a wireless protocol such as a 2.4 GHz, 5 GHz, or 6 GHz band of the Institute of Electrical and Electronics Engineers (IEEE) 802.11 family of standards used for local area networking of devices and Internet access, a Bluetooth protocol defined by the Bluetooth Special Interest Group (SIG) to exchange data over short distances, or a Zigbee protocol based on the IEEE 802.15.4 standard for creating personal area networks with small, low-power digital radios. A host system 104 may be coupled to the wireless platform 100, and the wireless system 102 may facilitate access to a wireless network infrastructure over an air interface 114. The host system 102 may be a computer system, a multi-media access point, a cell phone, a (portable) game machine, a Personal Digital Assistant (PDA), a smart phone, an internet of things (IOT) device, or any other type of device coupled to the wireless platform 102 and benefits from accessing the wireless network infrastructure. The wireless platform 100, the wireless system 102, and the host system 104 may each comprise one or more circuitry such as analog circuitry, mixed signal circuitry, memory circuitry, logic circuitry, and/or processing circuitry that executes code stored in a memory to perform disclosed functions.

Each wireless system 102 may have a media access control (MAC) circuitry 108, a baseband circuitry 110, and one or more wireless radios, an example of which is shown as wireless radio 112. The media access control (MAC) processing circuitry 108 and baseband circuitry 110 implement a MAC layer and a physical layer, respectively, of an open systems interconnection (OSI) reference model for data transmission. The MAC layer is responsible managing access to a transmission medium such as channels of the air interface 114 and the physical layer comprises transmission technologies to transmit bits over the air interface 114. The wireless system 102 may implement lower layers of the OSI reference model such as the MAC layer and the physical layer and the host system 102 may implement upper layers of the OSI reference model. For instance, the MAC processing circuitry 108 and the baseband circuitry 110 may implement respective layers associated with 802.11 WiFi communication protocol, Bluetooth communication protocol, 802.15.4 Zigbee communication protocol, or some other wireless communication protocol.

The wireless radio 112 may receive one or more data streams from the baseband circuitry 110 to transmit as one or more wireless signals over the air interface 114. Circuitry of the wireless radio 112 associated with receiving the data stream and transmitting the wireless signal is referred to as an RF path 130. In examples, the wireless radio 112 may have one or more RF paths 130-1 to 130-$n$. Each RF path 130 may have an radio frequency (RF) transceiver 116 coupled to an antenna 118 and define a transmit path or a receive path. In the transmit path of the RF path 130, the RF transceiver 116 mixes the data stream onto a RF carrier wave to produce a modulated RF signal which is transmitted over the antenna 118 as a wireless signal over the air interface 114. The RF transceiver 110 may have an oscillator (not shown) to generate the RF carrier wave and a mixer (not shown) to perform the mixing of the RF carrier wave with the data stream to generate the modulated RF signal which is transmitted over the antenna 118. In the receive path of the RF path 130, the antenna 118 receives a modulated RF signal from the air interface 114 which is mixed by the mixer with the RF carrier wave generated by the oscillator to recover a data stream from the modulated RF signal. The RF transceiver 116 may provide the data stream to the baseband circuitry 110 for processing. In some examples, the wireless radio 112 may have different RF paths for transmitting or receiving signals in different frequency bands such as a 5 GHz or 2.4 GHz spectrum associated with WiFi communication. In other examples, the wireless system 102 may have a first wireless radio for transmitting or receiving signals in a first frequency band such as 5 GHz and a second wireless radio for transmitting or receiving signals in a second frequency band such as 2.4 GHz.

In examples, the RF transceiver 116 may also include a power amplifier 120. The power amplifier 120 amplifies a modulated RF signal prior to transmission by the antenna 118 over the air interface 114 as a wireless signal. The power amplifier 120 (i.e., low noise amplifier) also amplifies a modulated RF signal received by the antenna 118 over the air interface 114 prior to processing by the RF transceiver 110. In examples, the power amplifier 120 may be one or more of an internal power amplifier, external power amplifier, or combination thereof. The internal power amplifier may be internal to a wireless chip of the wireless system 102 and the external power amplifier may be external to the wireless chip of the wireless system 102. In some examples, the use of both the internal power amplifier and external power amplifier reduces heat generated by the power amplifier 120 because the internal power amplifier and external power amplifier each operate at a lower power for a same transmit power.

The wireless system 102 may also have a temperature sensor 124 to measure a temperature associated with the wireless system 102 such as a junction temperature. The junction temperature may be a highest operating temperature of the wireless system 102. To measure the junction temperature, the temperature sensor 124 may be positioned at one or more circuits of the wireless system 102 such as the power amplifier 120. The temperature sensor 124 may measure the temperature over a period of time. In some examples, the temperature measured over the period of time may be averaged and the temperature sensor 124 may provide the temperature as the average temperature. In some examples, the temperature of the power amplifier 120 may be measured while a wireless radio 112 operates in each of an awake and sleep state and the temperature sensor 124 may provide a maximum temperature of the power amplifiers 120 during the awake and sleep states. The wireless radio 102 may operate in the sleep state when it is not transmitting wireless signals to reduce power consumption and may operate in an higher power awake state when the wireless radio 102 is to transmit wireless signals. In some examples, the temperature sensor 124 may be positioned at the power amplifier 120 of each RF path 130 of the one or more wireless radios 112 and a maximum temperature corresponding to the maximum one of a plurality of temperatures measured by each of a plurality of temperature sensors may be indicative of the temperature of the wireless system 102. In some examples, the temperature sensor 124 may be positioned at other circuits to measure the temperature of the wireless system 102 such as a power converter.

Various embodiments described herein are directed to the wireless system 102 having a dynamic temperature management system 128 to control one or more operating parameters of the wireless system 102 based on a temperature provided by the temperature sensor 124. The dynamic temperature management system 128 controls the operating parameter to thereby control the power consumption of the wireless system 102 and the temperature of the wireless system 102 so that the wireless system 102 does not reach a critical temperature where the heat degrades performance of the wireless system 102 or worse the wireless system 102 fails to operate. In examples, the control of the temperature of the wireless system 102 results in the temperature of the wireless platform 100 and any other wireless systems on the wireless platform 100 also being controlled. In examples, the dynamic temperature management system 128 may control an operating parameter of the wireless system 102 via the MAC processing circuity 108. The dynamic temperature management system 128 may provide an indication to cause the MAC processing circuitry 108 to adjust the indicated operating parameters. In examples, the dynamic temperature management system 128 may change a register, memory location, or invoke an application programing interface (API) of the wireless system 102 to indicate the adjustment to the operating parameter of the wireless system 102 which causes the MAC processing circuitry 108 to adjust the operating parameter of the wireless system 102.

In one example, the operating parameter controlled by the dynamic temperature management system 128 is a number of active transmit paths in a wireless radio 112 of the wireless system 112. The transmit path may be active in the event that it is transmitting a wireless signal. A larger number of active transmit paths results in the wireless system 102 consuming a larger amount of power and the temperature of the wireless system 102 increasing. A lower number of active transmit paths results in the wireless system 102 consuming less power and the temperature of the wireless system 102 decreasing. The dynamic temperature management system 128 may decrease the temperature of a wireless system 102 by reducing a number of active transmit paths in the wireless radio 112 so that the wireless system 102 consumes less power. For instance, the dynamic temperature management system 128 may provide an indication to the MAC processing circuity 108 so that the wireless radio 112 operates with one transmit path instead of two transmit paths. Functionality of the receive transmit paths may be unchanged. Alternatively, the dynamic temperature management system 128 may increase temperature of a wireless system 102 by increasing a number of active transmit paths in the wireless radio 112 so that the wireless system 102 consumes more power. For instance, the dynamic temperature management system 128 may provide an indication to the MAC processing circuity 108 so that the wireless radio 112 operates with two transmit path instead of one transmit path. Functionality and operation of the receive transmit paths may be unchanged. In examples, a change to the number of active transmit paths in the wireless radio 112 may not need to be communicated to a receiver which receives the wireless signals that the wireless system 102 transmits over the air interface 114.

In another example, the operating parameter controlled by the dynamic temperature management system 128 is a transmit duration for a wireless radio 112 of the wireless system 102. The transmit duration may indicate a time interval during which the wireless radio 112 of the wireless system 102 transmits a wireless signal. In some examples, the transmit duration may be indicated by a duty cycle. A throttle period may be a sum of a time interval when the wireless radio 112 of the wireless system 102 is transmitting a wireless signal, referred to as the transmit duration and a time interval when the wireless radio 112 of the wireless system 102 is not transmitting a wireless signal, referred to as a throttle duration. A shorter transmit duration reduces a power consumption of the wireless system 102 and a longer transmit duration increases a power consumption of the wireless system 102. For example, the dynamic temperature management system 128 may decrease a temperature of the wireless system 102 by reducing a length of the transmit duration and increasing a length of the throttle duration to reduce power consumption and temperature of the wireless system 102. As another example, the dynamic temperature management system 128 may increase a temperature of the wireless system 102 by increasing a length of the transmit duration and decreasing a length of the throttle duration to increase power consumption and temperature of the wireless system 102. As an example, the throttle period and the throttle duration may each range up to 16 seconds with control at a resolution of one microsecond. The dynamic temperature management system 128 may set an indication in a register to indicate one or more of the throttle period and the throttle duration to the MAC processing circuitry 108. As an example, the indication may be 24 bits at a microsecond resolution. Then, the MAC processing circuitry 108 may trigger one or more channels over which a wireless signal is to be transmitted are busy for the throttle duration to control the transmit duration over the throttle period and reduce power consumption and temperature of the wireless system 102.

In yet another example, the operating parameter controlled by the dynamic temperature management system 128 is a maximum airtime. The maximum airtime specifies a maximum time interval during which the wireless radio 112 of the wireless system 102 is allowed to transmit a wireless signal. The maximum airtime may be related to the transmit duration in that the transmit duration may indicate how much of the maximum airtime is actually used to transmit the wireless signal. A longer maximum airtime results in the wireless system 102 consuming more power and increasing its temperature and a shorter maximum airtime results in the wireless system 102 consuming less power and decreasing its temperature. For example, the dynamic temperature management system 128 may reduce a temperature of the wireless system 102 by decreasing the maximum airtime. The dynamic temperature management system 128 may provide an indication to the MAC processing circuitry 108 of the wireless system 102 to decrease a maximum airtime of the wireless band which result in the wireless system 102 consuming less power and the temperature of the wireless system 102 decreasing. As another example, the dynamic temperature management system 128 may increase a temperature of the wireless system 102 by increasing the maximum airtime. The dynamic temperature management system 128 may provide an indication to the MAC processing circuitry 108 of the wireless system 102 to increase a maximum airtime of the wireless band which result in the wireless system 102 consuming more power and the temperature of the wireless system 102 increasing. In some examples, the maximum airtime adjustment by the dynamic temperature management system 128 may be bounded by a maximum airtime negotiated during an association of the wireless system 102 with an access point of the wireless network infrastructure which provides communication services to the wireless system 102.

In another example, the operating parameter controlled by the dynamic temperature management system 128 is a transmit power of a wireless radio 112 of the wireless radio 112. The transmit power may be a power at which the power amplifier 120 of the wireless radio 112 transmits wireless signals. A higher transmit power results in the wireless system 102 consuming more power and increased temperature. A lower transmit power results in the wireless system 102 consuming less power and decreased temperature. A dynamic temperature management system 128 may adjust temperature of the wireless system 102 by adjusting a transmit power. For example, the dynamic temperature management system 128 may provide an indication to the MAC processing circuitry 108 to decrease a transmit power which result in the power amplifier 120 of the wireless system 102 consuming less power and the temperature of the wireless system 102 decreasing. As another example, the dynamic temperature management system 128 may provide an indication to the MAC processing circuitry 108 to increase a transmit power which result in the wireless system 102 consuming more power and the temperature of the wireless system 102 increasing.

In yet another example, the operating parameter controlled by the dynamic temperature management system 128 is a minimum transmit rate for a wireless radio 112 of the wireless system 102. A decrease of the minimum transmit rate results in the wireless system 102 consuming less power and a temperature of the wireless system 102 decreasing. The dynamic temperature management system 128 may reduce temperature of the wireless system 102 by providing an indication to the MAC processing circuitry 108 associated with the wireless system 102 to reduce the minimum transmit rate. Alternatively, an increase of the minimum transmit rate results in the wireless system 102 consuming more power and a temperature of the wireless system 102 increasing. The dynamic temperature management system 128 may increase temperature of the wireless system 102 by providing an indication to the MAC processing circuitry 108 associated with the wireless system 102 to increase the minimum transmit rate. In examples, the MAC processing circuitry 108 may control a minimum transmit rate by changing a modulation and/or coding rate of the baseband circuitry 110. In some examples, reducing minimum transmit rate may result in a wireless radio 112 transmitting at a higher transmit power. The higher transmit power may result in higher power dissipation and higher temperature of the wireless system 102 unless the transmit power is also controlled in conjunction with the minimum transmit rate.

In another example, the operating parameter controlled by the dynamic temperature management system 128 is a clock frequency of clock circuitry 122 of the wireless system 102. The clock circuitry 122 may define timing of operations performed by the wireless system 102 including a data traffic speed of the wireless system 102. If the clock frequency is higher, then the wireless system 102 processes more data in a period of time compared to if the clock frequency is lower. If the wireless system 102 processes more data in the period of time, then the wireless system 102 consumes more power and temperature increases. If the wireless system 102 processes less data in the period of time, then the wireless system 102 consumes less power and temperature decreases. The dynamic temperature management system 128 may provide a signal to the clock circuitry 122 to adjust the clock frequency of the clock circuitry 122.

In yet another example, the operating parameter controlled by the dynamic temperature management system 128 is a maximum aggregated MAC protocol data unit (AMPDU) length associated with the WiFi protocol implemented by the MAC processing circuitry 108 of the wireless system 102. An MPDU is a unit of information defined by the MAC layer. The AMPDU is an aggregation of several MPDU blocks to reduce overhead associated with transmitting the MPDU blocks as a wireless signal over the air interface 114. For example, a single header may be used for a plurality of MPDUs to indicate data rates and packet lengths to the physical layer, rather than a header for each MPDU. The AMPDU cannot be disabled because it is negotiated with a receiver, but the length may be adjusted. If more MPDUs are aggregated, the wireless system 102 consumes more power because a longer transmit (TX) duration is needed to transmit the AMPDU. If fewer MPDUs are aggregated, the wireless system 102 consumes less power because a shorter TX duration is needed to transmit the AMPDU. The MAC processing circuity 108 determines a length of the maximum AMPDU based on the maximum airtime and a minimum transmit rate. The dynamic temperature management system 128 may decrease the length of the maximum AMPDU by providing an indication to adjust the maximum airtime or the transmit rate. If the length of the AMPDU decreases, then the wireless system 102 consumes less power and the temperature of the wireless system 102 decreases. Alternatively, the dynamic temperature management system 128 may increase a length of the maximum AMPDU by providing an indication to adjust the maximum airtime or the transmit rate. If the length of the AMPDU increases, then the wireless system 102 consumes more power and the temperature of the wireless system 102 increases.

In another example, the operating parameter controlled by the dynamic temperature management system 128 enables or disables an aggregated MAC service data unit (AMSDU) feature associated with the WiFi protocol. The host system 102 may provide MSDUs to a buffer 134 of the wireless system 102 when the MAC processing circuitry 108 implements a WiFi protocol. The MSDU is a unit of information received by the MAC layer from upper layers of the OSI model such as from the host system 102. A driver 136 in the host system 104 may aggregate the MSDUs to form an AMSDU which is provided to the buffer 134 to reduce overhead in providing the MSDUs to the wireless system 102. For example, a single header may be needed for a plurality of MSDUs rather than a header for each MSDU. The tradeoff of the aggregation is increased power consumption for the MAC processing circuitry 108 to process the AMSDUs. Alternatively, the driver 136 may not aggregate the MSDUs and increase data overhead associated with transmitting MSDUs to the buffer 134 with a tradeoff of decreased power consumption by the MAC processing circuitry 108 to process the MSDUs. The dynamic temperature management system 128 may reduce temperature of the wireless system 102 by providing an indication to the driver 136 in the host system 104 to disable the host system 104 from aggregating MSDUs which are provided to the buffer 134 and then to the MAC processing circuitry 108. In turn, the wireless chip consumes less power and temperature of the wireless system 102 may reduce. Alternatively, the dynamic temperature management system 128 may increase temperature of the wireless system 102 by providing an indication to the driver 106 in the host system 104 to enable aggregating MSDUs which are provided to the buffer 134 and then to the MAC processing circuitry 108. In turn, the wireless chip consumes more power and temperature of the wireless system 102 increases. In examples, the disabling of the AMDSU does not need to be communicated to a receiver which receives wireless signals from the wireless system 102.

In yet another example, the operating parameter controlled by the dynamic temperature management system 128 is whether the wireless radio 112 of the wireless system 112 is turned off or turned on. The wireless radio 112 may be turned on by enabling the transmit and receive paths of the wireless radio 112. The wireless radio 112 may be turned off by disabling the transmit and receive paths of the wireless radio 112. A dynamic temperature management system 128 may adjust temperature of the wireless system 102 by turning on or off a wireless radio 102. For example, the dynamic temperature management system 128 may provide an indication to the MAC processing circuitry 108 to turn off a wireless radio which result in the temperature of the wireless system 102 decreasing. As another example, the dynamic temperature management system 128 may provide an indication to the MAC processing circuitry 108 to turn on a wireless radio which result in the temperature of the wireless system 102 increasing. In some examples, the wireless radio 112-1 may operate in accordance with a wireless protocol such as Bluetooth, Zigbee, or WiFi. The dynamic temperature management system 128 may turn off the wireless radio based on the type of the wireless protocol such that a wireless radio operating with one type of protocol may be turned off but a wireless radio operating with another type of protocol is not turned off.

In another example, a first dynamic temperature management system 128 associated with a first wireless system 102-1 may communicate with a second dynamic temperature management system 128 associated with a second wireless system 102-2. The wireless platform 100 may facilitate this inter-wireless system communication. The first dynamic temperature management system 128 may enable or disable the wireless radio 112 associated with the first wireless system 102-1 based on exchange of information with the second dynamic temperature management system 128 of the second wireless system 102-2. The information may include a temperature of the second wireless system 102-2 or an indication of a wireless protocol operating on the second wireless system 102-2. In examples, the wireless radio 112 associated with the first wireless system 102-1 may operate based on a different wireless protocol compared to the wireless radio 112 associated with the second wireless system 102-2. The wireless radio 112 associated with the first wireless system 112-1 may operate in accordance with Bluetooth, Zigbee, or WiFi. In one example, the first dynamic temperature management system 128 may 106 turn off its wireless radio 112 to decrease power consumption of the first wireless system 102-1 based on the information exchanged. In another example, the first dynamic temperature management system 128 may turn on its wireless radio 112 and increase power consumption of the first wireless system 102-1 based on the information exchanged.

Example Operation

Figure 2:
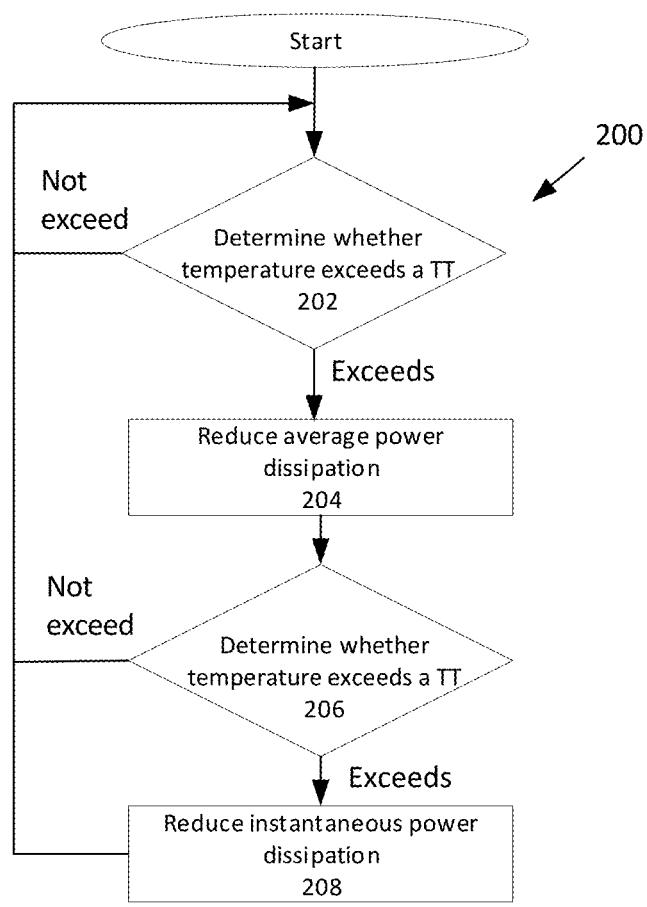
FIG. 2 is an example flow chart of functions performed by the wireless system to manage temperature in accordance with exemplary embodiments of the invention.

FIG. 2 is an example flow chart of functions 200 performed by the dynamic temperature management system 128 to regulate temperature. The flow chart of functions illustrates example functions of the dynamic temperature management system 128 to reduce power consumption and temperature of the wireless system 102. In examples, a function may be implemented using circuitry associated with the dynamic temperature management system 128 such as analog circuitry, mix signal circuitry, memory circuitry, logic circuitry, and/or processing circuitry which executes code stored in a memory to perform the disclosed functions.

Processing may begin at step 202 with a wireless system 102 determining whether a temperature exceeds a temperature threshold (TT). In examples, the dynamic temperature management system 128 may measure a temperature of a power amplifier 120 of a wireless radio 112 of the wireless system 102. In the event that the temperature does not exceed the TT, then processing returns back to step 202. Otherwise, in the event that a temperature exceeds a TT, then processing continues to step 204.

At step 204, the dynamic temperature management system 128 reduces an average power dissipation of the wireless system 102. The average power dissipation may be reduced by adjusting one or more operating parameters of the wireless system 112 which effect the average power dissipation.

In one example, the average power dissipation is decreased by reducing a number of number of active transmit paths on a wireless radio 112 of the wireless system 102 in the event that the number of active transmit paths is greater than one. The transmit path may be considered to be active in the event that it is transmitting a wireless signal and inactive in the event that it is not transmitting a wireless signal. The dynamic temperature management system 128 may access a register, memory location, or invoke an application programing interface (API) of the wireless system 102 which indicates the number of active transmit paths on the wireless radio 112 to determine the number of active transmit paths on the wireless radio 112. In the event that the number is greater than one, the dynamic temperature management system 128 reduces a number of transmit paths which are operating in the wireless radio 112 by at least one. The dynamic temperature management system 128 may provide an indication to cause the MAC processing circuitry 108 to reduce a number of transmit paths. For example, the dynamic temperature management system 128 may change a register, memory location, or invoke an application programing interface (API) of the wireless system 102 to indicate the reduced number of active transmit paths on the wireless radio which causes the MAC processing circuitry 108 to reduce a number of transmit paths. The reduction in the number of transmit paths may reduce power consumption of the wireless system 102. In some examples the number of active transmit paths may be changed without change to the number active receive paths.

The average power dissipation may be reduced in other ways as well including decreasing a length of an AMPDU, disabling aggregation of MSDUs to form AMSDUs, reducing a transmit duration of the wireless radio 112 of the wireless system 102, or reducing a maximum airtime of the wireless radio 112 of the wireless system 102. The dynamic temperature management system 128 may provide an indication to cause the MAC processing circuitry 108 or the host system 104 to decrease a length of an AMPDU, disable aggregation of MSDUs to form AMSDUs, reduce a transmit duration, or reduce a maximum airtime. For example, the dynamic temperature management system 128 may change a register, memory location, or invoke an application programing interface (API) of the wireless system 102 to provide the indication.

At step 206, a determination is made whether the temperature continues to exceeds a TT. In response to the temperature not continuing to exceeds a TT, then dynamic temperature management system 128 may return to step 202. In response to the temperature continuing to exceeds a TT, then at step 208, the dynamic temperature management system 128 reduces an instantaneous power dissipation. The instantaneous power dissipation may be reduced by adjusting one or more operating parameters of the wireless system 112 which effects the instantaneous power dissipation.

The instantaneous power dissipation may be reduced by reducing one or more of a transmit power of the wireless radio 112 of the wireless system 102, a transmit rate of the wireless radio 112 of the wireless system 102, or a clock frequency of the clock 122. The dynamic temperature management system 128 may provide an indication to cause the MAC processing circuitry 108 to reduce the transmit power, a transmit rate, or a clock frequency. For example, the dynamic temperature management system 128 may change a register, memory location, or invoke an application programing interface (API) of the wireless system 102 provide the indication.

In another example, the instantaneous power dissipation is decreased by disabling a wireless radio 112. The wireless radio 112 may be disabled to not transmit any wireless signals and not receive any wireless signals. The dynamic temperature management system 128 may provide an indication to cause the MAC processing circuitry 108 to disable a wireless radio. For example, the dynamic temperature management system 128 may change a register, memory location, or invoke an application programing interface (API) of the wireless system 102 to indicate to disable a wireless radio which causes the MAC processing circuitry 108 to disable a wireless radio. The disabling of the wireless radio may reduce power consumption of the wireless system 102.

In examples, the dynamic temperature management system 128 may have an activity table which indicates how the dynamic temperature management system 128 adjusts operating parameters of the wireless system 112 when a temperature reaches a TT. The dynamic temperature management system 128 may determine operating parameters of the wireless system 102 and access the activity table to determine a TT. Then if the temperature reaches the TT, the dynamic temperature management system 128 accesses a policy of the activity table to determine how to adjust the operating parameters to reduce a power consumption and temperature of the wireless system 102.

FIG. 3 is an example activity table 300 to manage temperature of the wireless system 102. The activity table 300 may have a plurality of activity indices (AIs), examples of which are shown as activity index 1 and activity index 2. Each activity index may identify a plurality of operating parameters of the wireless system 102. For example, the operating parameters may be a number of active transmit paths 302 and whether a transmit aggregation (AMPDU) 304 is enabled ("ON") or disabled ("OFF") for a wireless radio 112 such as a 2.4 GHz radio (2G) or similarly for a 5 GHz radio (5G). If the temperature of the wireless system 102 reaches a TT 306 when the wireless radio 112 is operating in the operating parameters specified in the activity index, then the activity index defines a policy 308 to adjust one or more operating parameters to reduce power consumption and temperature of the wireless system 102. In examples, the activity table 300 may be stored in a memory accessible by the dynamic temperature management system 128. In some examples, an activity table may be specific to where the temperature of the wireless system 102 is measured. One activity table may be defined if a temperature of an external power amplifier is measured and other activity table may be defined if a temperature of an internal power amplifier is measured.

To illustrate, activity index 1 may define operating parameters of a wireless system 102 comprising 2 active transmit paths and transmitter aggregation enabled for a wireless radio 112 in each of a 2.4 GHz band or 5 GHz band. The activity index 1 may also define a TT of 115° C. In the event that the dynamic temperature management system 128 determines that a temperature associated with the wireless system 102 reaches the TT when the wireless system 102 is operating with these operating parameters, the activity index 1 provides a policy to adjust the operating parameters. The policy is to adjust the maximum airtime to 1 ms and the transmit duration duty cycle to 50% for the wireless radios 112 of the wireless system 102. The dynamic temperature management system 128 may cause the MAC processing circuitry 108 to adjust the maximum airtime to 1 ms and the transmit duty cycle to 50% for the wireless radios 112 of the wireless system 102. The adjustment reduces power consumption of the wireless system 102 and temperature of the wireless system 102. The dynamic temperature management system 128 may continue to monitor the temperature and make further adjustment to the operating parameters to reduce the temperature to below the TT based on a respective activity index.

Figure 4:
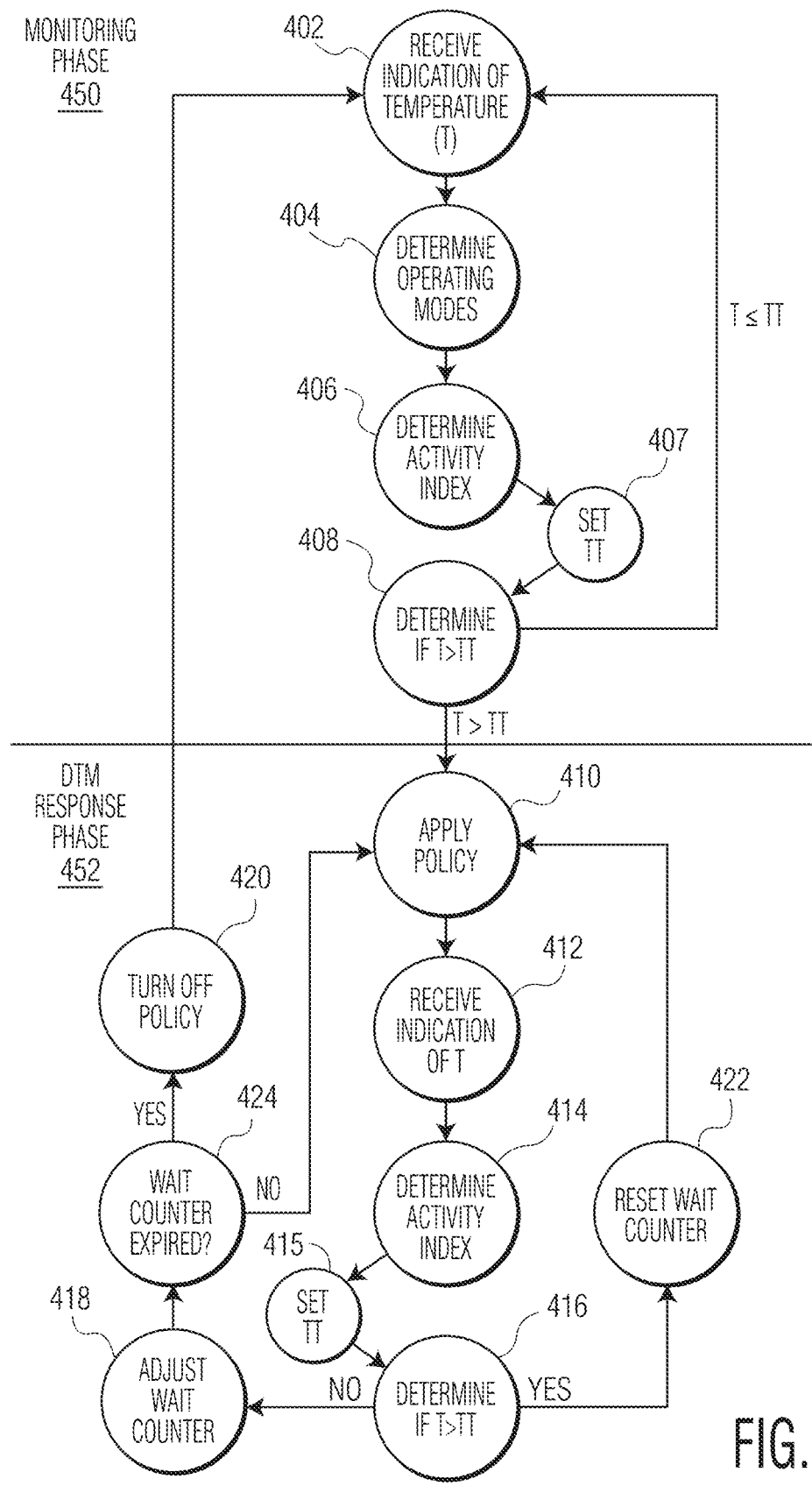
FIG. 4 is an example flow chart of functions performed by a dynamic temperature management system to manage temperature of the wireless system in accordance with exemplary embodiments of the invention.

FIG. 4 is an example flow chart of functions 400 performed by the dynamic temperature management system 128 to manage temperature of the wireless system 102. In examples, a function may be implemented using circuitry associated with the dynamic temperature management system 128 such as analog circuitry, mix signal circuitry, memory circuitry, logic circuitry, and/or processing circuitry that executes code stored in a memory to perform the disclosed functions.

The flow chart of functions 400 may have two phases, a monitoring phase 450 and a dynamic temperature management (DTM) response phase 452. The monitoring phase 450 may include processing while a temperature associated with the wireless system 102 is less than a TT. The dynamic temperature management response phase 452 may include processing to reduce the power consumption of the wireless system 102 when the temperature associated with the wireless system 102 reaches or exceeds the TT.

At step 402, the dynamic temperature management system 128 receives an indication of a temperature T. The dynamic temperature management system 128 may receive the indication of the temperature from the temperature sensor 124 of the wireless system 102. In examples, the temperature sensor 124 may be located at one or more of an internal power amplifier or external power amplifier of a power amplifier 120 at a wireless radio 112 of the wireless system 102.

At step 404, the dynamic temperature management system 128 determines one or more operating parameters of the wireless system 102. In examples, the dynamic temperature management system 128 may access a register, memory location, or invoke an application programing interface (API) of the wireless system 102 which indicates the one or more operating parameters of the wireless system 102.

At step 406, the dynamic temperature management system 128 determines an activity index in an activity table 300 based on the one or more operating parameters. At step 407, the dynamic temperature management system 128 sets a TT. The TT which is set in step 407 may be defined by a TT of the activity index which indicates a temperature at which the dynamic temperature management system 128 adjusts the one or more operating parameters to reduce a power consumption and temperature of the wireless system 102.

At step 408, the dynamic temperature management system 128 determines if the temperature T exceeds the TT. If the temperature does not exceed the TT, then the dynamic temperature management 128 continues to monitor the temperature in the monitoring phase 450. If the temperature exceeds the TT, then the dynamic temperature management system 128 moves to the dynamic temperature management response phase 452.

At step 410, the dynamic temperature management system 128 applies a policy of the activity index. The policy may indicate one or more operating parameter of the wireless system 102 to reduce power consumption of the wireless system 102. The dynamic temperature management system 128 may provide an indication to cause the MAC processing circuitry 108 to adjust the indicated operating parameters. For example, the indication may be to change a register, memory location, or invoke an application programing interface (API) of the wireless system 102 to indicate the one or more operating parameter of the wireless system 102 which causes the MAC processing circuitry 108 to adjust the indicated operating parameters.

At step 412, the dynamic temperature management system 128 receives an indication of a temperature T from the temperature sensor 124.

At step 414, the dynamic temperature management system 128 determines an activity index based on the one or more operating parameters of the wireless system 102. The activity index may the same or different from that determined at step 406. At step 415, the dynamic temperature management system 128 sets a TT. The TT which is set in step 415 may be defined by a TT of the activity index determined at step 414.

At step 416, the dynamic temperature management system 128 determines whether the temperature exceeds a TT. If the temperature does not exceed the TT, then at step 418, the dynamic temperature management system 128 adjusts a wait counter. The wait counter has a count value which was initially set with a reset value (i.e., starting value of the wait counter) at some earlier time and the count value is periodically increased or decreased at step 418 until the count value reaches an expiration value which indicates expiration of the wait counter. In this way, the wait counter measures a period of time. The dynamic temperature management system 104 determines if the wait counter expires at step 424. If the counter expires, then the policy applied at step 412 is no longer applied at step 420 and the processing returns back to step 402. For example, the operating parameters of the wireless system 102 may revert back to before the policy was applied at step 410. If the wait counter has not expired, then the processing returns to step 410, where a policy is applied based on the activity index determined at step 414. The wait counter may provide a delay before the operating parameters revert back. In some examples, in addition to checking whether the wait counter is expired at step 424, the dynamic temperature management system 128 may also confirm whether the temperature does not exceed the TT. If the wait counter expires and the temperature does not exceed the TT, then processing moves to step 420. Otherwise, processing moves to step 410. If the temperature exceeds the TT at step 416, the dynamic temperature management system 128 may reset the wait counter to a reset value at step 422. Processing may also returns to step 410.

In some examples, the dynamic temperature management system 128 may also determine that the temperature T exceeds an emergency temperature. The emergency temperature may be a temperature greater than the TT. In the event that the temperature exceeds the emergency temperature, the dynamic temperature management system 128 may execute additional polices to further reduce the temperature of the wireless system 102. The additional policies may include turning off a wireless radio 112.

Figure 5A:
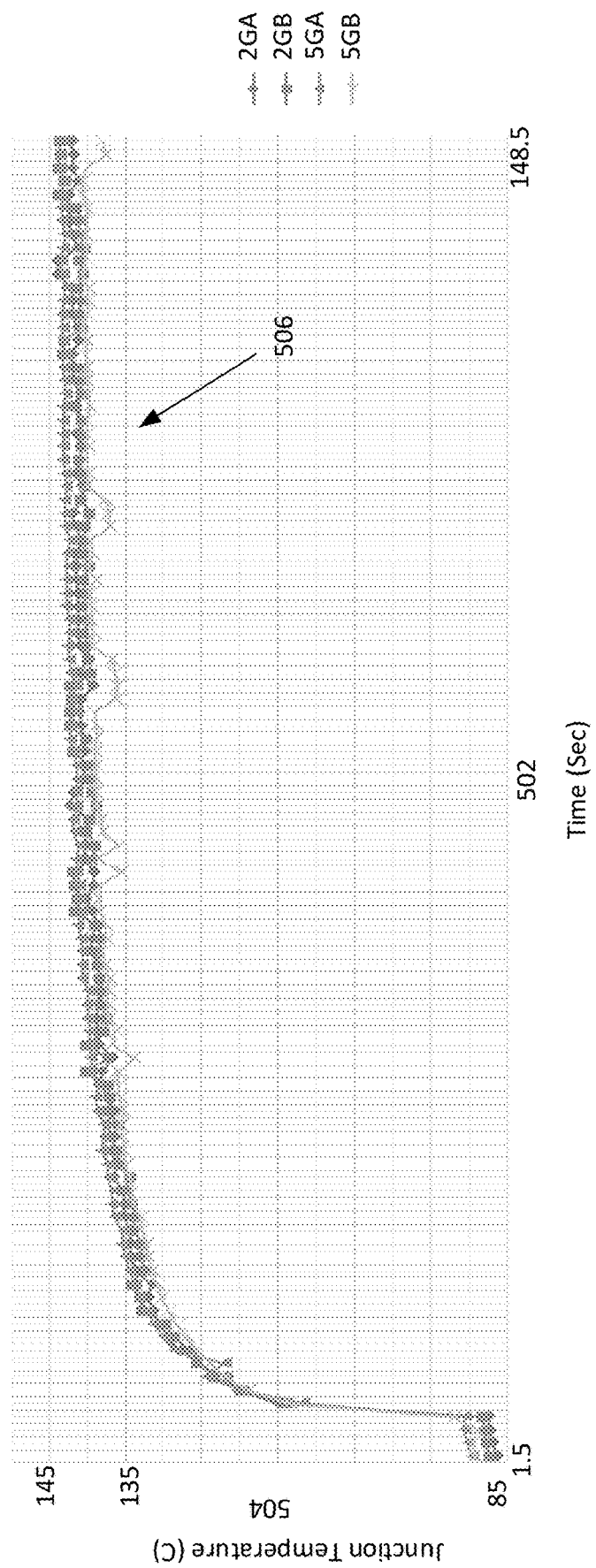
FIGS. 5A & 5B illustrate example plots of a thermal rise of the wireless system in the event that the dynamic power management is disabled and enabled in accordance with exemplary embodiments of the invention.
Figure 5B:
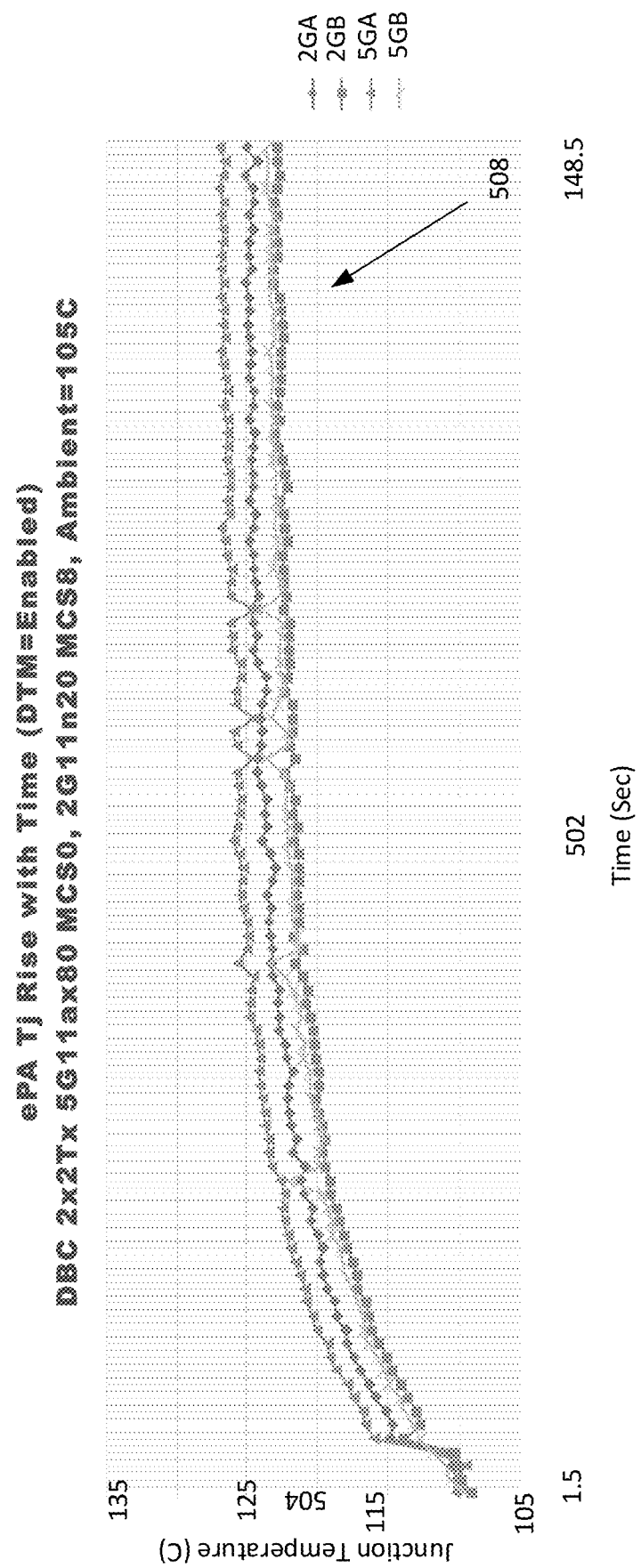

FIGS. 5A & 5B illustrates example plots of a thermal rise of a wireless system when dynamic power management is disabled and enabled, respectively.

In plot 506, the wireless system has a 2.4 GHz and a 5 GHz wireless radio each with 2 active transmit paths. The 2.4 GHz radio may have a modulation coding scheme (MCS) 8 associated with the WiFi standard and the 5 GHz radio may have an MCS 0. An ambient temperature of the wireless system is 85° C. Each wireless radio may have a power amplifier and plot 506 shows a temperature of a power amplifier on an axis 504 as a function of time on an axis 502 when dynamic power management is disabled for the wireless system. Plot 506 shows that each of the power amplifiers of the wireless radios in the wireless system reaches 135° C. which is above a 125° C. TT when dynamic power management is disabled.

In plot 508, the wireless system also has a 2.4 GHz and a 5 GHz wireless radio each with 2 active transmit paths. The 2.4 GHz radio may have a modulation coding scheme (MCS) 8 associated with the WiFi standard and the 5 GHz radio may have an MCS 0. An ambient temperature of the wireless system is 105° C. Each wireless radio may have a power amplifier and plot 508 shows a temperature of a power amplifier on an axis 504 as a function of time on an axis 502 when dynamic power management is enabled for the wireless system. One of each of the 2.4 GHz and 5 GHz wireless radios is disabled based on a policy associated with dynamic power management which results in the power amplifiers associated with the wireless radios which are not disabled having a temperature less than 125° C. and the power amplifiers associated with the wireless radios which are disabled having a temperature of 105° C. which is the same as the ambient temperature. The temperatures of the wireless radios are below a TT.

Example Apparatus

Figure 6:
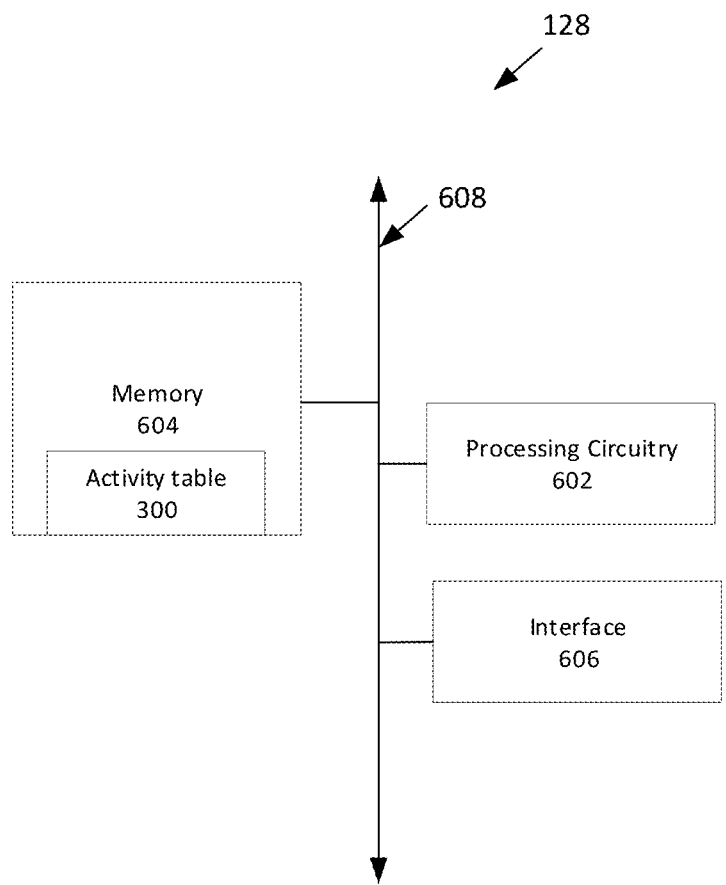
FIG. 6 illustrates an example dynamic thermal management system in accordance with exemplary embodiments of the invention.

FIG. 6 is an example arrangement of the dynamic thermal management system 128. The dynamic thermal management system 106 has processing circuitry 602 (possibly including multiple processors, multiple cores, multiple nodes, and/or implementing multi-threading, etc.) and memory 604 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. The memory 604 may store computer code, program instructions, computer instructions, program code, or machine code which when executed by the processing circuitry 602 performs functions of the dynamic thermal management system as described herein. In examples, the memory 604 may store the activity table 300. The dynamic thermal management system 128 may also be configured with an interface 606 to cause an operating parameter of the wireless system 102 to be adjusted. The interface 606 may take the form of a register, a memory other than memory 604, an application programming interface (API), or other mechanism to provide an indication to adjust an operating parameter of the wireless system 102. Interconnect 608 such as a bus (e.g., PCI, ISA, PCI-Express) may couple the processing circuitry 602, the memory 604, and the interface 606.

In one embodiment, a method to detect a moving object is disclosed. The method comprises determining a threshold temperature defined by one or more operating parameters of a wireless system, the threshold temperature indicating a temperature in response to which power consumption of the wireless system is reduced; receiving an indication of a temperature of the wireless system; determining that the temperature of the wireless system exceeds the threshold temperature; and providing an indication to cause a media access control (MAC) processing circuitry of the wireless system to adjust the one or more operating parameters of the wireless system to reduce the power consumption and the temperature of the wireless system based on the determination that the temperature exceeds the threshold temperature. In an embodiment, the method of receiving the indication of the temperature comprises receiving the indication from a temperature sensor located at a power amplifier of the wireless system. In an embodiment, the indication of the temperature of the wireless system is a maximum temperature, corresponding to the maximum one of a plurality of temperatures measured by each of a plurality of temperature sensors. In an embodiment, the method of providing the indication to cause the MAC processing circuitry of the wireless system to change the one or more operating parameters comprises causing the MAC processing circuitry to reduce a number of active transmit paths of a wireless radio of the wireless system and to retain a number of active receive paths. In an embodiment, the method of providing the indication to cause the MAC processing circuitry of the wireless system to change the one or more operating parameters comprises causing the MAC processing circuitry to reduce a length of an aggregated MAC protocol data unit (AMPDU). In an embodiment, the method further comprises providing an indication to a host coupled to the wireless system to disable forming aggregated MAC service data unit (AMSDU) provided to the wireless system. In an embodiment, the method of providing the indication to cause the MAC processing circuitry of the wireless system to change the one or more operating parameters comprises causing the MAC processing circuitry to reduce one or more of a transmit duration, a transmit rate, a transmit power, or a maximum airtime of a wireless radio of the wireless system. In an embodiment, the one or more operating parameters prior to adjustment is a first one or more operating parameters and the adjusted one or more operating parameters is a second one or more operating parameters, the method further comprising: receiving at least one further indication of a temperature; determining that the further indication of the temperature no longer exceeds the threshold temperature; and providing an indication to cause the MAC processing circuitry of the wireless system to change the second one or more operating parameters associated with the wireless system back to first one or more operating parameters. In an embodiment, the method further comprises detecting expiration of a wait counter; and wherein the second one or more operating parameters of the wireless system are changed back to the first one or more operating parameters in response to the detection of the expiration of the wait counter.

In another embodiment, a wireless system is disclosed. The wireless system comprises: a temperature sensor comprising circuitry configured to provide an indication of a temperature of the wireless system; a dynamic temperature manager comprising circuitry configured to: determine a threshold temperature based on an indication of one or more operating parameters of the wireless system; and determine that the temperature exceeds the threshold temperature, the threshold temperature indicating a temperature in response to which power consumption of the wireless system is reduced; and a media access control (MAC) processing circuitry comprising circuitry configured to receive an indication to adjust the one or more operating parameters of the wireless system to reduce the power consumption and the temperature of the wireless system based on the determination that the temperature exceeds the threshold temperature. In an embodiment, the wireless system further comprises a power amplifier, wherein the indication of the temperature is the indication of the temperature of the power amplifier. In an embodiment, the indication of the temperature of the wireless system is a maximum temperature, corresponding to the maximum one of a plurality of temperatures measured by each of a plurality of temperature sensors. In an embodiment, the MAC processing circuitry is further comprising circuitry configured to cause the MAC processing circuitry to reduce a number of active transmit paths of a wireless radio of the wireless system and to retain a number of active receive paths. In an embodiment, the MAC processing circuitry further comprises circuitry configured to cause the MAC processing circuitry to reduce a length of an aggregated MAC protocol data unit (AMPDU). In an embodiment, the dynamic temperature manager further comprises circuitry configured to provide an indication to a host coupled to the wireless system to disable forming aggregated MAC service data unit (AMSDU) which are provided to the wireless system. In an embodiment, the MAC processing circuitry further comprises circuitry configured to cause the MAC processing circuitry to reduce one or more of a transmit duration, a transmit rate, a transmit power, and a maximum airtime of a wireless radio of the wireless system to reduce the power consumption and the temperature of the wireless system based on the determination that the temperature exceeds the threshold temperature. In an embodiment, the one or more operating parameters prior to adjustment is a first one or more operating parameters and the adjusted one or more operating parameters is a second one or more operating parameters; and wherein the dynamic temperature manager further comprises circuitry configured to determine that the temperature no longer exceeds the threshold temperature; and, in response to determining that the temperature no longer exceeds the threshold temperature, to provide an indication to cause the MAC processing circuitry of the wireless system to change the second one or more operating parameters back to first one or more operating parameters. In an embodiment, the wireless system further comprises a wait counter, wherein the dynamic temperature manager is further comprising circuitry configured to detect expiration of a wait counter; and to change the second one or more operating parameters of the wireless system back to the first one or more operating parameters in response to expiration of the wait counter. In an embodiment, the wireless system further comprises a wireless radio, wherein the dynamic temperature manager is further comprising circuitry configured to disable the wireless radio based on the determination that the temperature exceeds the threshold temperature. In an embodiment, the wireless radio is configured to operate a wireless protocol, wherein the dynamic temperature manager further comprises circuitry configured to disable the wireless radio based on a type of the wireless protocol and the determination that the temperature exceeds the threshold temperature.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising:
   determining a threshold temperature defined by one or more operating parameters of a wireless system, the threshold temperature indicating a temperature in response to which power consumption of the wireless system is reduced;
   receiving an indication of a temperature of the wireless system;

determining that the temperature of the wireless system exceeds the threshold temperature; and providing an indication to cause a media access control (MAC) processing circuitry of the wireless system to adjust the one or more operating parameters of the wireless system to reduce the power consumption and the temperature of the wireless system based on the determination that the temperature exceeds the threshold temperature;

wherein the one or more operating parameters prior to adjustment is a first one or more operating parameters and the adjusted one or more operating parameters is a second one or more operating parameters, the method further comprising: receiving at least one further indication of a temperature; determining that the further indication of the temperature no longer exceeds the threshold temperature;

detecting expiration of a wait counter; and providing an indication to cause the MAC processing circuitry of the wireless system to change the second one or more operating parameters associated with the wireless system back to first one or more operating parameters; wherein the second one or more operating parameters of the wireless system are changed back to the first one or more operating parameters in response to the detection of the expiration of the wait counter and the determination that the further indication of the temperature no longer exceeds the threshold temperature.

2. The method of claim 1, wherein receiving the indication of the temperature comprises receiving the indication from a temperature sensor located at a power amplifier of the wireless system.

3. The method of claim 1, wherein the indication of the temperature of the wireless system is a maximum temperature, corresponding to the maximum one of a plurality of temperatures measured by each of a plurality of temperature sensors.

4. The method of claim 1, wherein providing the indication to cause the MAC processing circuitry of the wireless system to change the one or more operating parameters comprises causing the MAC processing circuitry to reduce a number of active transmit paths of a wireless radio of the wireless system and to retain a number of active receive paths.

5. The method of claim 1, wherein providing the indication to cause the MAC processing circuitry of the wireless system to change the one or more operating parameters comprises causing the MAC processing circuitry to reduce a length of an aggregated MAC protocol data unit (AMPDU).

6. The method of claim 1, further comprising providing an indication to a host coupled to the wireless system to disable forming aggregated MAC service data unit (AMSDU) provided to the wireless system.

7. The method of claim 1, wherein providing the indication to cause the MAC processing circuitry of the wireless system to change the one or more operating parameters comprises causing the MAC processing circuitry to reduce one or more of a transmit duration, a transmit rate, a transmit power, or a maximum airtime of a wireless radio of the wireless system.

8. A wireless system comprising:
a temperature sensor comprising circuitry configured to provide an indication of a temperature of the wireless system;
a wait counter;
a dynamic temperature manager comprising circuitry configured to: determine a threshold temperature based on an indication of one or more operating parameters of the wireless system; and determine that the temperature exceeds the threshold temperature, the threshold temperature indicating a temperature in response to which power consumption of the wireless system is reduced;
a media access control (MAC) processing circuitry comprising circuitry configured to receive an indication to adjust the one or more operating parameters of the wireless system to reduce the power consumption and the temperature of the wireless system based on the determination that the temperature exceeds the threshold temperature;
wherein the one or more operating parameters prior to adjustment is a first one or more operating parameters and the adjusted one or more operating parameters is a second one or more operating parameters; and wherein the dynamic temperature manager further comprises circuitry configured: to determine that the temperature no longer exceeds the threshold temperature; and in response to determining that the temperature no longer exceeds the threshold temperature, detecting expiration of the wait counter, provide an indication to cause the MAC processing circuitry of the wireless system to change the second one or more operating parameters of the wireless system back to the first one or more operating parameters in response to expiration of the wait counter.

9. The wireless system of claim 8, further comprising a power amplifier, wherein the indication of the temperature is the indication of the temperature of the power amplifier.

10. The wireless system of claim 8, wherein the indication of the temperature of the wireless system is a maximum temperature, corresponding to the maximum one of a plurality of temperatures measured by each of a plurality of temperature sensors.

11. The wireless system of claim 8, wherein the MAC processing circuitry is further comprising circuitry configured to cause the MAC processing circuitry to reduce a number of active transmit paths of a wireless radio of the wireless system and to retain a number of active receive paths.

12. The wireless system of claim 8, wherein the MAC processing circuitry is further comprising circuitry configured to cause the MAC processing circuitry to reduce a length of an aggregated MAC protocol data unit (AMPDU).

13. The wireless system of claim 8, wherein the dynamic temperature manager is further comprising circuitry configured to provide an indication to a host coupled to the wireless system to disable forming aggregated MAC service data unit (AMSDU) which are provided to the wireless system.

14. The wireless system of claim 8, wherein the MAC processing circuitry further comprises circuitry configured to cause the MAC processing circuitry to reduce one or more of a transmit duration, a transmit rate, a transmit power, and a maximum airtime of a wireless radio of the wireless system to reduce the power consumption and the temperature of the wireless system based on the determination that the temperature exceeds the threshold temperature.

15. The wireless system of claim 8, further comprising a wireless radio, wherein the dynamic temperature manager is further comprising circuitry configured to disable the wireless radio based on the determination that the temperature exceeds the threshold temperature.

16. The wireless system of claim 15, wherein the wireless radio is configured to operate a wireless protocol, wherein the dynamic temperature manager further comprises circuitry configured to disable the wireless radio based on a type of the wireless protocol and the determination that the temperature exceeds the threshold temperature.

* * * * *